United States Patent
Adachi (10) Patent No.: US 9,367,734 B2
(45) Date of Patent: Jun. 14, 2016

(54) APPARATUS, CONTROL METHOD, AND STORAGE MEDIUM FOR SETTING OBJECT DETECTION REGION IN AN IMAGE

(71) Applicant: CANON KABUSHIKI KAISHA, Tokyo (JP)

(72) Inventor: Keiji Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 169 days.

(21) Appl. No.: 14/078,991

(22) Filed: Nov. 13, 2013

(65) Prior Publication Data

US 2014/0161312 A1 Jun. 12, 2014

(30) Foreign Application Priority Data

Dec. 12, 2012 (JP) .................... 2012-271778

(51) Int. Cl.
*G06K 9/00* (2006.01)
*G06K 9/62* (2006.01)

(52) U.S. Cl.
CPC ........ *G06K 9/00362* (2013.01); *G06K 9/00624* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 6,816,611 B1 * | 11/2004 | Hagiwara | G06K 9/4647 340/5.53 |
| 7,796,840 B2 * | 9/2010 | Mori | G06K 9/00228 382/118 |
| 7,873,221 B2 | 1/2011 | Okada et al. | |
| 8,711,942 B2 * | 4/2014 | Maruyama | H04N 19/597 375/240.16 |
| 2002/0051561 A1 * | 5/2002 | Inagaki | G06T 7/0002 382/106 |
| 2002/0154148 A1 * | 10/2002 | Inoue | G09G 5/14 345/660 |
| 2004/0101162 A1 * | 5/2004 | Higaki | G01C 11/00 382/103 |
| 2004/0183663 A1 * | 9/2004 | Shimakage | G06K 9/00798 340/436 |
| 2005/0131646 A1 * | 6/2005 | Camus | B60R 21/013 701/301 |
| 2005/0225540 A1 * | 10/2005 | Kawakami et al. | 345/173 |
| 2007/0053614 A1 * | 3/2007 | Mori | G06K 9/6857 382/299 |

(Continued)

FOREIGN PATENT DOCUMENTS

| | | |
|---|---|---|
| CN | 1928887 A | 3/2007 |
| CN | 101867725 A | 10/2010 |

(Continued)

OTHER PUBLICATIONS

Chinese Office Action dated Feb. 14, 2016 in Chinese Application No. 201310670514.3.

*Primary Examiner* — Utpal Shah
*Assistant Examiner* — Samah Beg
(74) *Attorney, Agent, or Firm* — Fitzpatrick, Cella, Harper & Scinto (57) ABSTRACT

A setting apparatus for setting a detection processing region to detect a specific object from an image, the setting apparatus includes: an acquisition unit configured to acquire an input concerning the detection processing region from a user interface; and a setting unit configured to set the detection processing region to detect the specific object in accordance with evaluation information for the input concerning the detection processing region acquired from the user interface.

27 Claims, 9 Drawing Sheets

(56) References Cited

U.S. PATENT DOCUMENTS

| | | | | |
|---|---|---|---|---|
| 2007/0086648 | A1* | 4/2007 | Hayashi | G06K 9/00228 382/154 |
| 2008/0037837 | A1* | 2/2008 | Noguchi | G06K 9/00335 382/118 |
| 2008/0166024 | A1* | 7/2008 | Iketani | B60R 1/00 382/107 |
| 2009/0034954 | A1* | 2/2009 | Kubota et al. | 396/121 |
| 2010/0284571 | A1* | 11/2010 | Tanigawa | G01B 11/03 382/106 |
| 2010/0329565 | A1* | 12/2010 | Kunieda | G06K 9/00228 382/190 |
| 2011/0050939 | A1* | 3/2011 | Tsurumi | G06K 9/00228 348/222.1 |
| 2011/0083102 | A1* | 4/2011 | Adachi | 715/800 |
| 2011/0158537 | A1* | 6/2011 | Uno | 382/190 |
| 2011/0243381 | A1* | 10/2011 | Tsagkatakis et al. | 382/103 |
| 2012/0062600 | A1* | 3/2012 | Fukasawa et al. | 345/660 |
| 2012/0114179 | A1* | 5/2012 | Okada et al. | 382/103 |
| 2012/0159267 | A1* | 6/2012 | Gyorffy | 714/55 |
| 2012/0216208 | A1* | 8/2012 | Takemura et al. | 718/103 |
| 2013/0061098 | A1* | 3/2013 | Shigehara | G06F 11/24 714/47.1 |
| 2013/0064424 | A1* | 3/2013 | Adachi | G06T 7/0044 382/103 |
| 2013/0201346 | A1* | 8/2013 | Kanno et al. | 348/169 |
| 2013/0215270 | A1* | 8/2013 | Murashita | B60R 1/00 348/148 |
| 2013/0343604 | A1 | 12/2013 | Adachi | |
| 2014/0119600 | A1* | 5/2014 | Maruyama | 382/103 |
| 2014/0161312 | A1* | 6/2014 | Adachi | G06K 9/00362 382/103 |
| 2014/0205144 | A1* | 7/2014 | Inada | 382/103 |
| 2014/0211999 | A1* | 7/2014 | Kwiatkowski | G01C 1/04 382/103 |
| 2015/0215546 | A1* | 7/2015 | Adachi | H04N 5/23296 348/240.2 |
| 2015/0287215 | A1* | 10/2015 | Ohba | G06T 7/0044 382/103 |
| 2015/0371376 | A1* | 12/2015 | Adachi | G06T 7/004 348/140 |

FOREIGN PATENT DOCUMENTS

| | | |
|---|---|---|
| CN | 101872431 A | 10/2010 |
| CN | 102404499 A | 4/2012 |
| JP | 2002-373332 A | 12/2002 |
| JP | 2007-135115 A | 5/2007 |

* cited by examiner

| Parameter 1 | |
|---|---|
| Coordinates | (100, 100), (100, 300) |
| Region Type | Line |
| Area | (0, 0), (200, 400) |
| Size | 100-200 |
| Attribute | human |
| Event | cross_right_to_left |

APPARATUS, CONTROL METHOD, AND STORAGE MEDIUM FOR SETTING OBJECT DETECTION REGION IN AN IMAGE

BACKGROUND OF THE INVENTION

1. Field of the Invention

The present invention relates to a setting apparatus, an image processing apparatus, a control method of the setting apparatus, and a storage medium.

2. Description of the Related Art

Conventionally, when detecting a specific target such as a face or a human body from a video of a monitoring camera, one or a plurality of collation patterns (dictionaries) storing the features of the target object are used in general, and an object matching the collation patterns is detected from a detection target region of the image. For example, Japanese Patent Laid-Open No. 2007-135115 discloses a method of speeding up processing by switching the priority of a thumbnail image (layer) to be used for pattern matching based on a past image capturing result. According to Japanese Patent Laid-Open No. 2007-135115, a detected object such as a human body is tracked, thereby sensing crossing over or intrusion in a specific place of the video.

Japanese Patent Laid-Open No. 2002-373332 discloses a technique of detecting an object based on motion vectors, estimating the search position in the next frame, and tracking the object by template matching.

Detection processing of a specific target needs to be executed at a high speed against the backdrop of an increase in the number of pixels of a network camera device and the necessity of accurate real-time processing for monitoring or the like.

However, object detection processing by template matching or the like yields a heavy processing load. For this reason, a method of limiting the detection target range to a partial region of the screen in advance when setting the detection target region of a specific target or a method of making the processing region small by setting only a region with a motion as the detection target region in a video is employed.

Alternatively, a method of lowering the detection processing frequency to a processable level by time-serially thinning processing image frames or a method of performing not real-time processing but batch processing for a recorded video is employed.

When accurately performing specific target detection processing, the load increases, and the speed decreases. To perform high-speed processing, low-load detection processing is performed. That is, there is a tradeoff relationship.

In the specific object detection method using template matching or the like, the processing load changes depending on the background video of the detection processing region. This is especially conspicuous when the background video is complex or includes a number of regions similar to the detection target object. That is, the processing speed changes depending on the background image even for the same detection target or detection processing region. Hence, even when the user wants to obtain a response speed by making the sensing range small upon setting the sensing region, it may be impossible to obtain the expected performance.

The present invention has been made in consideration of the above-described problems, and provides a technique of suppressing occurrence of the event of an increase in the load or a decrease in the processing speed when performing processing of detecting a specific object from an image obtained from a monitoring camera or the like.

SUMMARY OF THE INVENTION

According to one aspect of the present invention, there is provided a setting apparatus for setting a detection processing region to detect a specific object from an image, comprising: an acquisition unit configured to acquire an input concerning the detection processing region from a user interface; and a setting unit configured to set the detection processing region to detect the specific object in accordance with evaluation information for the input concerning the detection processing region acquired from the user interface.

According to another aspect of the present invention, there is provided an image processing apparatus including a detection unit configured to detect a specific object from an image, comprising: an acquisition unit configured to acquire an input from a user interface to designate a detection processing region in which the detection unit performs detection processing; and a processing unit configured to perform predetermined processing in accordance with a detection situation by the detection unit in the detection processing region according to the input acquired by the acquisition unit.

According to still another aspect of the present invention, there is provided a control method of a setting apparatus for setting a detection processing region to detect a specific object from an image, comprising: an acquisition step of acquiring an input concerning the detection processing region from a user interface; and a setting step of setting the detection processing region to detect the specific object in accordance with evaluation information for the input concerning the detection processing region acquired from the user interface.

According to yet another aspect of the present invention, there is provided a non-transitory computer-readable storage medium storing a program to control a computer including a detection unit configured to detect a specific object from an image, the program comprising: an acquisition step of acquiring an input from a user interface to designate a detection processing region in which the detection unit performs detection processing; and a processing step of performing predetermined processing in accordance with a detection situation by the detection unit in the detection processing region according to the input acquired in the acquisition step.

According to still yet another aspect of the present invention, there is provided a non-transitory computer-readable storage medium storing a program to control a computer for setting a detection processing region to detect a specific object from an image, the program comprising: an acquisition step of acquiring an input concerning the detection processing region from a user interface; and a setting step of setting the detection processing region to detect the specific object in accordance with evaluation information for the input concerning the detection processing region acquired from the user interface.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings. Note that the constituent elements described in the embodiments are merely examples. The technical scope of the present invention is determined by the scope of claims and is not limited by the following individual embodiments.

First Embodiment

An image processing apparatus according to this embodiment is applicable to an image processing circuit incorporated in an image capturing apparatus such as a monitoring camera or an information processing apparatus such as a personal computer. The image processing apparatus according to this embodiment performs, at the time of detection processing region setting attended with specific object detection (human body detection or face detection) in an image, detection processing of the specific object and interactively controls detection processing region setting in accordance with a processing load serving as the evaluation value of the detection processing region.

Figure 1:
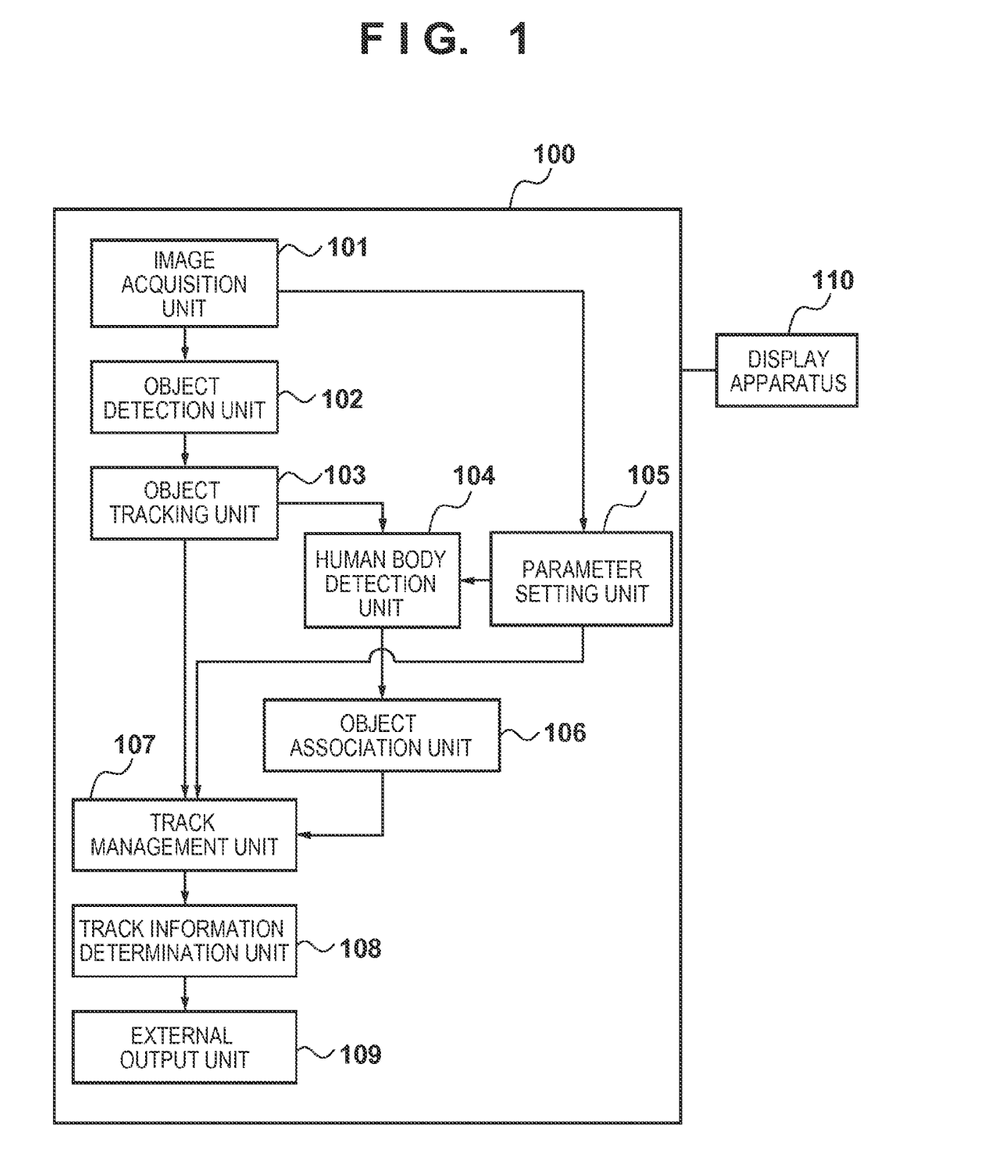
FIG. 1 is a block diagram showing an example of the arrangement of an image processing apparatus according to the first embodiment.

An example of the arrangement of an image processing apparatus 100 according to the first embodiment will be described with reference to FIG. 1. The image processing apparatus 100 can be a general information processing apparatus, an image processing circuit mounted on a camera capable of capturing a moving image, or an image processing circuit mounted on another device. The image processing apparatus 100 has a function of displaying a moving image including a moving object on the display screen and thus sensing that the object moving in the display screen has crossed a sensing line for object crossing detection set in the display screen. Although an image processing apparatus will be described in this embodiment, the present invention is also applicable to a video processing apparatus because the contents of processing do not change even when a video is acquired and processed on a frame basis.

The image processing apparatus 100 includes an image acquisition unit 101, an object detection unit 102, an object tracking unit 103, a human body detection unit 104, a parameter setting unit 105, an object association unit 106, a track management unit 107, a track information determination unit 108, and an external output unit 109. The image processing apparatus 100 is connected to a display apparatus 110 including a CRT (Cathode Ray Tube) or a liquid crystal screen. The display apparatus 110 displays a processing result of the image processing apparatus 100 by an image or text. An example will be described below in which a moving image is displayed on the display screen of the display apparatus 110.

The image acquisition unit 101 acquires an externally supplied moving image or still image and sends the acquired moving image or still image to the object detection unit 102 of the subsequent stage. Upon acquiring a moving image, the image acquisition unit 101 sequentially sends the images of frames of the moving image to the object detection unit 102. Upon acquiring a still image, the image acquisition unit 101 sends the still image to the object detection unit 102. Note that the supply source of the moving image or still image is not particularly limited, and can be a server apparatus or image capturing apparatus which supplies a moving image or still image via wired or wireless communication. The supply source is not limited to an external device, and the moving image or still image may be acquired from the internal memory of the image processing apparatus 100. A case in which one image is input to the object detection unit 102 will be described below independently of whether the image acquisition unit 101 acquires a moving image or still image. When a moving image is acquired, the one image corresponds to each frame of the moving image. When a still image is acquired, the one image corresponds to the still image.

The object detection unit 102 detects, by background subtraction, an object from the frame image acquired from the image acquisition unit 101. The information of the detected object includes a position on the screen, a circumscribed rectangle, and the size of the object. The object detection unit 102 has a function of detecting an object from an image, and the method is not limited to a specific one.

When the object detection unit 102 detects, from the image of a frame of interest, the same object as that detected from the frame image immediately before the frame of interest, the object tracking unit 103 associates the objects in the respective frames with each other. For example, assume that the object tracking unit 103 assigns an object ID=A to the object detected from the frame image immediately before the frame of interest by the object detection unit 102. When the object detection unit 102 detects the object from the image of the frame of interest as well, the object tracking unit 103 assigns the object ID=A to the object as well. If identical objects are detected from a plurality of frames, the object tracking unit 103 assigns the same object ID to the objects. Note that the object tracking unit 103 assigns a new object ID to an object newly detected from the frame of interest.

As a method of causing the object tracking unit 103 to determine whether objects in a plurality of frames are identical, for example, if the moving position of an object predicted using the moving vector of the detected object and the detected object position fall within a predetermined range, the objects are determined as identical. Alternatively, objects having a high correlation between frames may be associated using the color, shape, size (area), and the like of the objects. The object tracking unit 103 performs processing of determining identical objects in a plurality of frames and tracking the object. The method is not limited to a specific one, and any method of performing the same processing is usable.

In a human body detection processing region set by the parameter setting unit 105 to be described later, the human body detection unit 104 executes human body detection processing for the region where the object detection unit 102 has detected the object, thereby detecting a human body. The human body detection unit 104 need only have a function of detecting a human body from an image, and the processing is not limited to pattern processing. In this embodiment, the detection target is a human body but is not limited to a human body. The detection target can be a human face, vehicle, animal, or the like. A specific object detection unit for detecting a plurality of kinds of specific objects may be provided. If a plurality of detection processes can simultaneously be performed, a plurality of specific object detection processes may be executed. Human body detection need not always be performed in the region detected by the object detection unit 102 and the region set by the parameter setting unit 105. Object detection processing of the object detection unit 102 may be omitted, and human body detection processing may be performed only for the region set by the parameter setting unit 105.

The parameter setting unit 105 sets a human body detection processing region used for human body detection processing in each frame. The parameter setting unit 105 can set not only the human body detection processing region but also parameters to set the same human body detection processing region for the object detection unit 102 and the human body detection unit 104 as well. In this embodiment, object detection processing is performed in the region of the whole screen without setting the detection range for the descriptive convenience. In general, when the human body detection processing region to perform human body detection processing is made narrow, the human body detection processing can be completed in a short time, and the detection processing speed increases. Details of the method of setting the human body detection processing region will be described later.

The parameter setting unit 105 acquires or sets parameters to determine whether the object in each frame image has crossed a sensing line for object sensing. The parameter setting unit 105 acquires or sets setting information that defines the sensing line for object sensing. The parameter setting unit 105 sends the acquired or set parameters to the human body detection unit 104 or the track information determination unit 108 to be described later.

An example of the arrangement of parameters acquired or set by the parameter setting unit 105 will be described with reference to FIG. 2. The parameters shown in FIG. 2 define a line that connects coordinates (100, 100) and coordinates (100, 300) on a coordinate system defined on the display screen of the display apparatus 110 as the sensing line for object sensing. The parameters also define that when an object of human attribute having a size of 100 to 200 has crossed the sensing line from right to left (cross_right_to_left), the object is set as the sensing target. Note that the crossing direction for crossing determination can be set to, for example, from left to right (cross_left_to_right) (first crossing direction) from the start point toward the end point. The crossing direction for crossing determination can also be set to from right to left (cross_right_to_left) (second crossing direction). The crossing direction for crossing determination can also be set to both the first crossing direction and the second crossing direction (cross_both).

Figure 2:
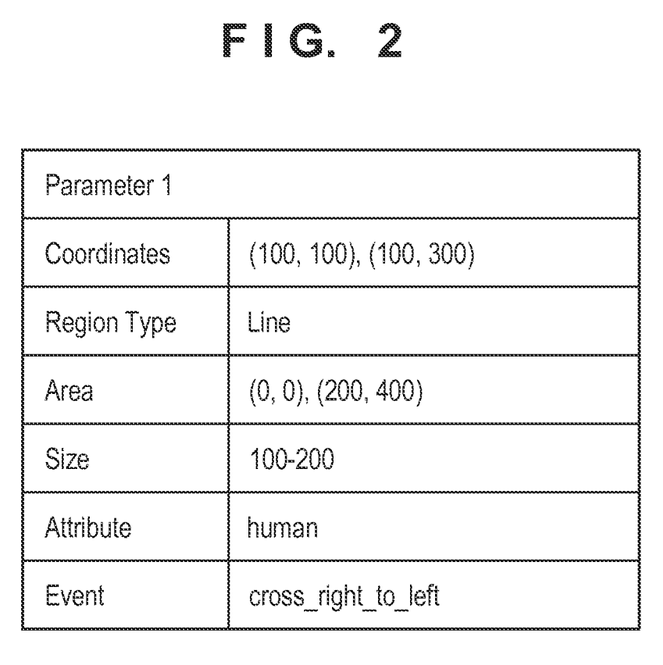
FIG. 2 is a view showing an example of the arrangement of parameters set by a parameter setting unit.

In the parameters shown in FIG. 2, Area indicates the region (human body detection processing region) to perform human body detection processing. When Area is limited to a partial region in the screen, the human body detection processing speed can be improved. In this embodiment, the initial value of Area uniquely indicates a predetermined range (100 pixels or less) around the sensing line. For this reason, the initial value of Area indicates a rectangular region represented by coordinates (0, 0) and (200, 400).

The reason why the initial value is set for Area is that after the sensing line is decided, human body detection processing is executed once or a plurality of times using a temporary initial value of Area to estimate the detection speed at the time of operation, and Area is assumed to be changed later in accordance with the obtained result. The detection speed calculated here is used as evaluation information of the detection processing region.

Human body detection processing range setting processing according to the first embodiment will be described with reference to screen display examples shown in FIGS. 3A to 3F. A setting screen 300 is a screen to do various kinds of sensing settings using the image obtained by the image acquisition unit 101 as a background image. A sensing line 301 for object sensing is a line defined by coordinates on the screen. The sensing line 301 is a line segment that connects a start point 302 of the sensing line and an end point 303 of the sensing line. When the crossing direction information set for the sensing line 301 is from right to left (cross_right_to_left), the direction in the screen to determine the crossing of an object over the sensing line 301 is the leftward direction from right to left. A mouse cursor 304 is an example of a GUI (user interface) to do various kinds of settings. When setting the sensing line, the line segment is drawn by the drag-and-drop operation of the mouse cursor 304. A human body detection processing region 305 is a rectangle virtually representing the range to perform human body detection processing. The human body detection processing region 305 is a region in a predetermined range around the sensing line 301.

In this embodiment, the sensing line is a straight line (sensing line 301), and the human body detection processing region 305 is a rectangle. However, they may have other shapes. For example, when a closed region defined by a plurality of coordinates is set, like a sensing region 307 defined by a plurality of coordinates including a node 306 in FIG. 3A, the region may be set as the human body detection processing region. Alternatively, a region including the periphery of the sensing region 307 (closed region) may be set as the human body detection processing region to perform human body detection processing. Otherwise, a region using not only straight lines but also curved lines or a virtual region on a three-dimensional space may be set as the sensing region.

The human body detection unit 104 acquires an estimated processing load (=evaluation information of detection processing region) for the human body detection processing range temporarily decided based on the region set on the setting screen 300. When the sensing line 301 is drawn and decided using the mouse cursor 304 in FIG. 3A, a temporary human body detection processing region (=temporary Area) is obtained. The human body detection unit 104 performs human body detection processing region once for the temporary human body detection processing region. As the characteristic of the human body detection processing, the more complex the background image of the temporary human body detection processing region is, the longer the processing time is. Hence, the human body detection unit 104 performs human body detection processing for the temporary human body detection processing region, thereby measuring an approximate estimated processing time.

Figure 3A:
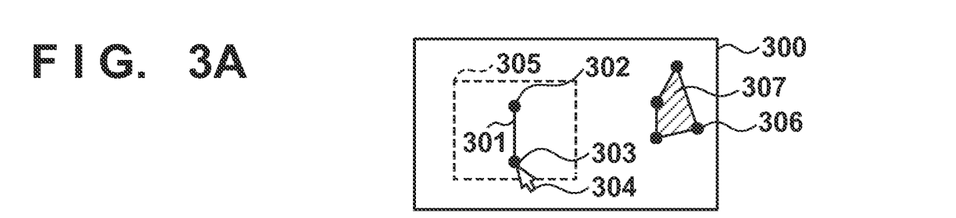
FIGS. 3A to 3F are views showing examples of screens to perform human body detection processing range setting processing.
Figure 3B:
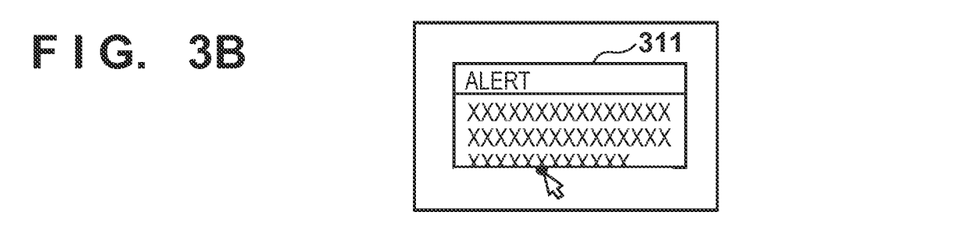
Figure 3C:
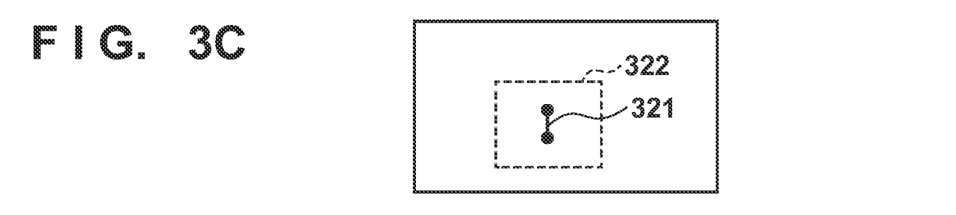

If the measured estimated processing time is longer than a set predetermined processing time (reference information (reference time)), the human body detection unit 104 displays an alert window 311 on the setting screen 300 to prompt changing the set location or narrowing the sensing region setting range (FIG. 3B). For example, the alert is displayed when the sensing system needs a detection function of 10 fps on average, and the measurement result of the estimated processing time is not 100 ms or less. Alternatively, the human body detection unit 104 may automatically narrow the sensing line and the range of the human body detection processing region, as shown in FIG. 3C, such that the estimated processing time becomes shorter than the set predetermined processing time. A sensing line 321 shown in FIG. 3C is set to be shorter than the sensing line 301 shown in FIG. 3A. A human body detection processing region 322 shown in FIG. 3C is set to be narrower than the human body detection processing region 305 shown in FIG. 3A. In this case, when the sensing line 301 is drawn and decided using the mouse cursor 304, as in FIG. 3A, the human body detection unit 104 first performs human body detection processing region in the temporary human body detection processing region. If the estimated processing time is longer than a predetermined time, the sensing line and the human body detection processing region range are evenly reduced in the vertical and horizontal directions, and the estimated processing time is measured each time. When the estimated processing time has become shorter than the predetermined time, the human body detection processing region 322 and the sensing line 321 decided by the above-described process are displayed on the screen.

In the setting method of FIG. 3C, the temporary sensing line is set once. After that, the sensing line and the human body detection processing region that are automatically calculated are redisplayed. However, during sensing line setting (during mouse cursor drag), the estimated processing time at that time may be measured successively, and control may be done to display the alert window or prohibit movement of the mouse cursor on the setting screen so the processing time does not exceed the set time.

Figure 3D:
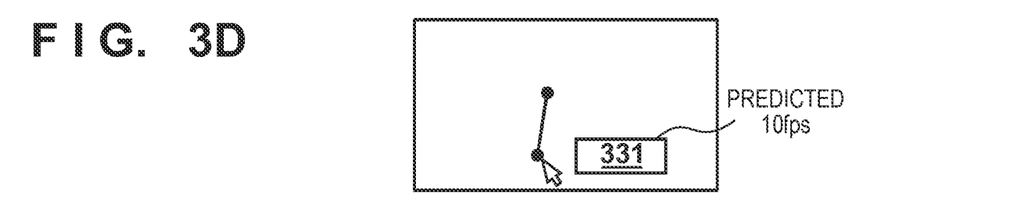
Figure 3E:
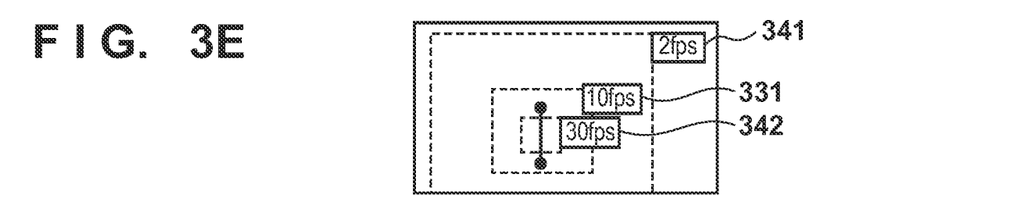

Alternatively, as shown in FIG. 3D, upon deciding the temporary sensing line or during sensing line setting (during mouse cursor drag), the human body detection unit 104 may measure the processing time at that time and display an estimated processing speed 331 (predicted processing speed) on the setting screen. Otherwise, in addition to measuring the estimated processing speed at that time during setting and displaying it on the setting screen of the display unit, as shown in FIG. 3D, estimated processing speeds 341 and 342 in the periphery of the temporary sensing line may be displayed together, as shown in FIG. 3E.

In this embodiment, an example has been explained in which the estimated processing speed is measured once at the time of parameter setting, and the human body detection processing region is decided in accordance with the measurement result of the processing speed (evaluation information). However, the present invention is not limited to this example. For example, the background image of the human body detection processing region may be monitored during execution of sensing processing, and upon detecting a change in the background image, an alert "resetting is necessary" or the like may be displayed, or the processing region may automatically be corrected. In the above-described background image change monitoring processing, a predetermined threshold may be provided, and only when the change is equal to or larger than the threshold, an alert "resetting is necessary" or the like may be displayed, or the processing region may be corrected.

As in the above-described example, when the estimated processing speed, alert, and processing range are displayed on the setting screen step by step or in advance, the range, the processing speed, and the like can interactively be adjusted upon setting the parameters.

In this embodiment, human body detection processing is performed once for the temporary human body detection processing region. However, the processing load may be measured a plurality of times, and the average value, the maximum value, or the like may be used. In this embodiment, the video of the image acquisition unit 101 is directly displayed as the background image of the human body detection processing region and used as the background image upon setting the sensing line. However, a past video or still image may be used. For example, an image including no human body or an image at a crowded time with many people may be used as the background. Alternatively, for a morning or night with a changing background image, a measurement result of one image or a combination of a plurality of images may be used.

The parameters shown in FIG. 2 used to set the temporary human body detection processing region may be extended to have setting values for each time or situation, and the setting values to be applied may be changed for each time or situation of actual human body detection. That is, the detection region setting may be changed on the image basis. The "situation" indicates a state in which the background image changes, for example, a weather or illumination situation such as sunshine or shade or an open/close situation of a door included in the background. These situations may be obtained by image analysis processing, or detected using another sensor and combined with the human body detection range setting processing of the image processing apparatus 100. The human body detection processing of the human body detection unit 104 according to the first embodiment has been described above.

Figure 4A:
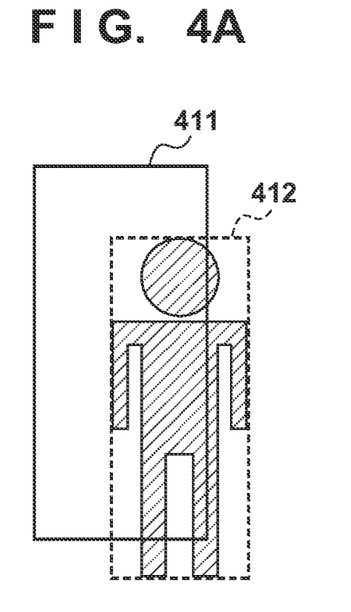
FIGS. 4A and 4B are views for explaining association of an object and a human body.
Figure 4B:
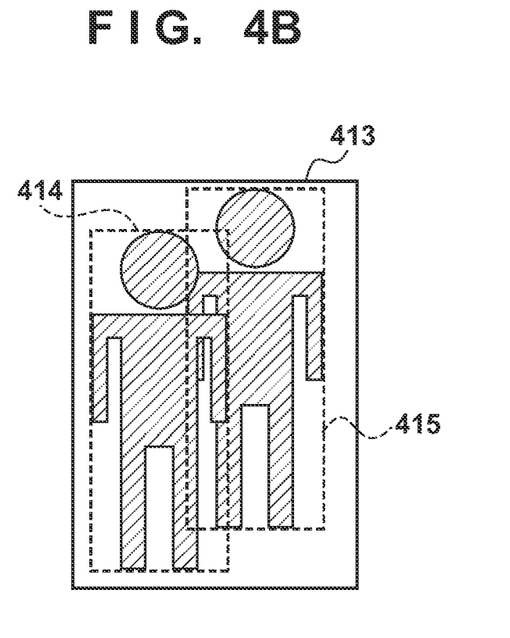

Referring back to FIG. 1, the functions of other processing units included in the image processing apparatus 100 will be described. The object association unit 106 associates the object detected by the object detection unit 102 with the human body detected by the human body detection unit 104. An example of the association of a detected object and a detected human body will be described with reference to FIGS. 4A and 4B. FIG. 4A shows an example in which a circumscribed rectangle 411 of an object detected by the object detection unit 102 does not include a circumscribed rectangle 412 of a human body detected by the human body detection unit 104. The object association unit 106 performs association when the overlap ratio of the circumscribed rectangle 412 of the human body to the circumscribed rectangle 411 of the object exceeds a preset threshold. The overlap ratio is the ratio of the area of the overlap portion between the circumscribed rectangle 411 of the object and the circumscribed rectangle 412 of the human body to the area of the circumscribed rectangle 412 of the human body. On the other hand, FIG. 4B shows an example in which a plurality of human bodies are detected from a circumscribed rectangle 413 of an object detected by the object detection unit 102. In this case, when the overlap ratio of each of a circumscribed rectangle 414 of a human body and a circumscribed rectangle 415 of a human body to the circumscribed rectangle 413 of the object exceeds a preset threshold, the object association unit 106 performs association for each of the circumscribed rectangle 414 of the human body and the circumscribed rectangle 415.

The track management unit 107 manages the information of the objects acquired from the object detection unit 102 and the object tracking unit 103 as management information on the object basis. An example of the management information managed by the track management unit 107 will be described with reference to FIG. 5. In management information 501, object information 502 is managed for each object ID. In the object information 502 corresponding to one object ID, information 503 of each frame in which the object was detected is managed. The information 503 includes a time stamp (Time Stamp) representing the date/time at which the information 503 was created, the position information (Position) of the detected object, and information (Bounding box) that defines a circumscribed rectangle including the object region. The information 503 also includes the size (Size) of the object and the attribute (Attribute) of the object. The pieces of information included in the information 503 are merely examples and are not limited to those shown in FIG. 5. An other information can be included if processing to be described below can be achieved. The management information 501 managed by the track management unit 107 is used by the track information determination unit 108.

Figure 5:
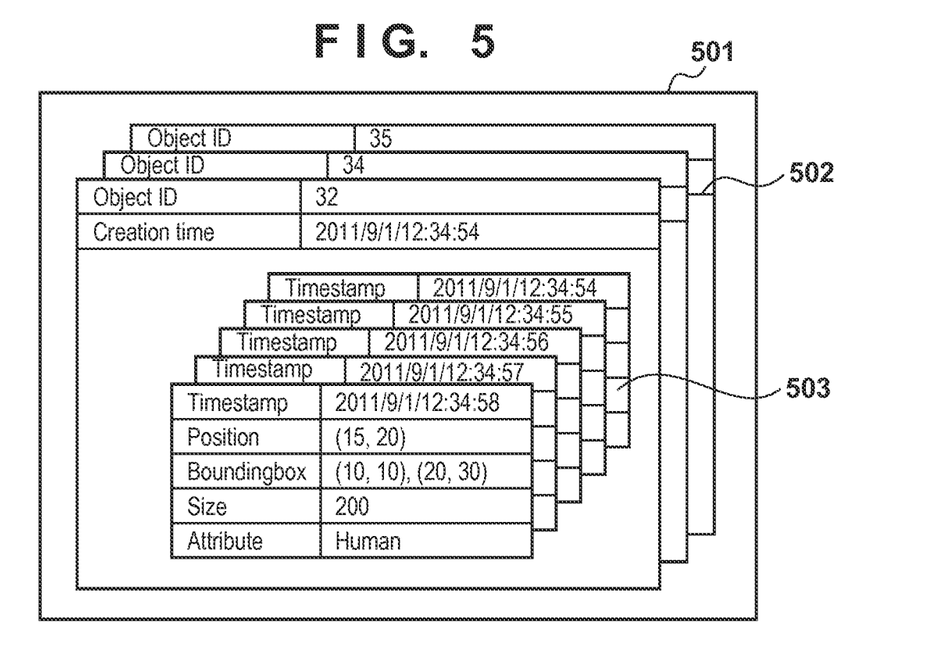
FIG. 5 is a view showing an example of the arrangement of information managed by a track management unit.

The track management unit 107 also updates the attributes (Attribute) of the objects in accordance with the result of association by the object association unit 106. The attributes (Attribute) of past objects can also be updated in accordance with the association result. The attributes (Attribute) of future objects may also be set in accordance with the association result. With this processing, management can be performed so that the tracking results of objects having the same object ID can have the same attribute at any time.

The track information determination unit 108 has the function of a crossing object sensing unit, and performs object crossing determination processing for a sensing line for object sensing in accordance with the parameters acquired or set by the parameter setting unit 105 and the management information managed by the track management unit 107.

Figure 6:
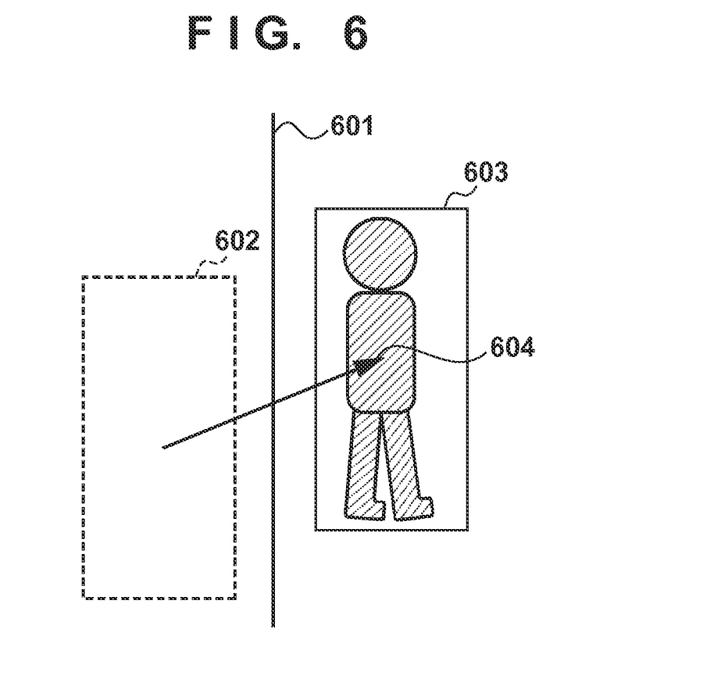
FIG. 6 is a view for explaining object crossing determination processing.

Processing to be performed by the track information determination unit 108 when the parameters described with reference to FIG. 2 are set will be described with reference to FIG. 6. The track information determination unit 108 determines whether a moving vector 604 from a circumscribed rectangle 602 of a human attribute object to a circumscribed rectangle 603 of a human attribute object crosses a line segment 601 (sensing line) defined by the parameters. The circumscribed rectangle 602 indicates the circumscribed rectangle of the human attribute object in a frame immediately before the frame of interest. The circumscribed rectangle 603 indicates the circumscribed rectangle of the human attribute object in the frame of interest. Determining whether the moving vector crosses the sensing line corresponds to determining whether the human attribute object crosses the line segment 601 (sensing line). The determination result of the track information determination unit 108 can externally be output via the external output unit 109. When the external output unit 109 has the function of a display unit formed from a CRT or a liquid crystal screen, the determination result can be displayed using the external output unit 109 in place of the display apparatus 110.

Figure 7:
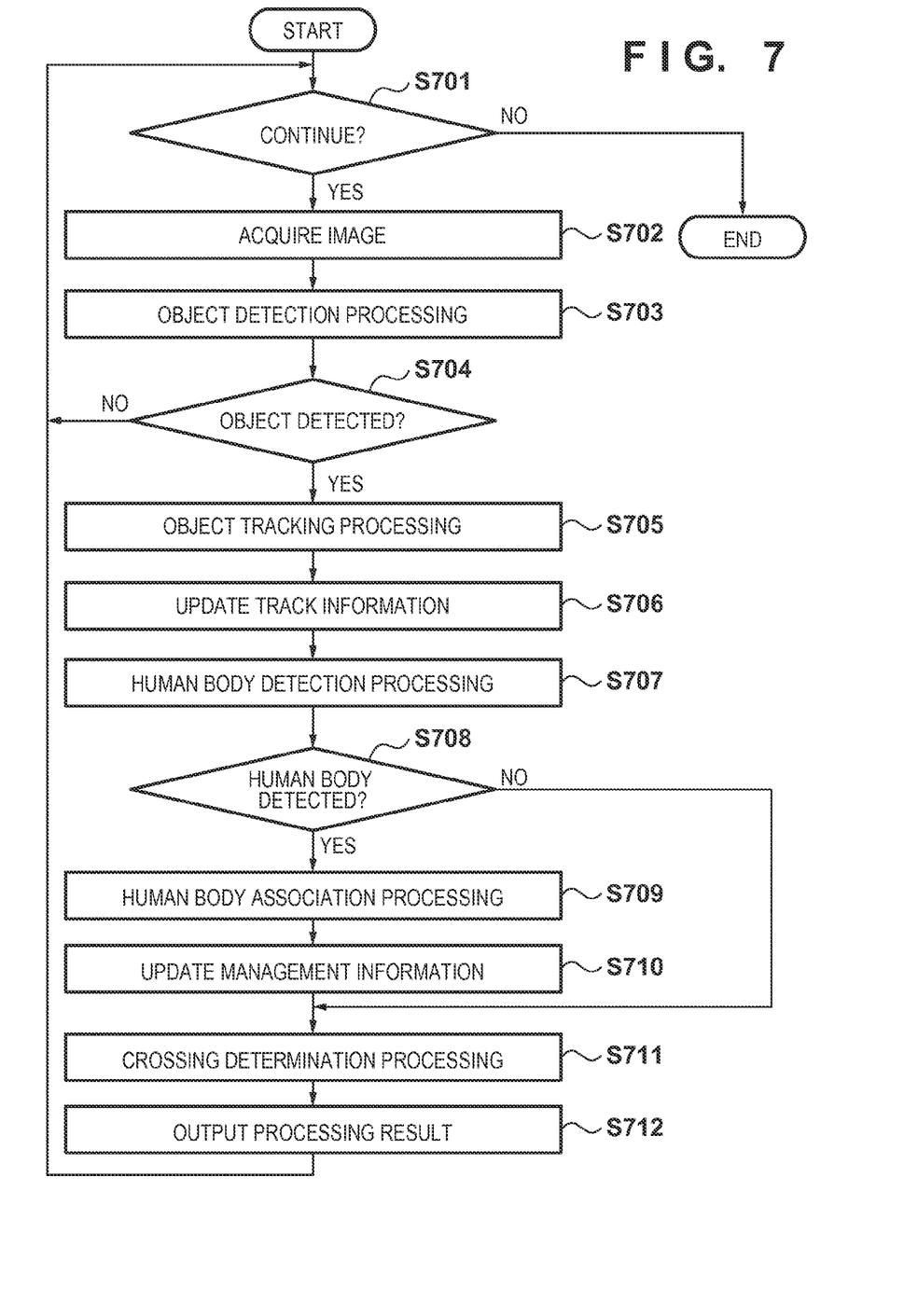
FIG. 7 is a flowchart showing the processing procedure of the image processing apparatus.

The procedure of processing to be executed by the image processing apparatus 100 according to the first embodiment will be described next with reference to the flowchart of FIG. 7. Note that the parameters as shown in FIG. 2 are registered in the image processing apparatus 100 in advance at the start of processing according to the flowchart of FIG. 7.

In step S701, a control unit (not shown) included in the image processing apparatus 100 determines whether to continue the processing. For example, based on whether a processing end instruction has been received from the user, the control unit determines whether to continue the processing. Upon receiving the processing end instruction and determining not to continue the processing (step S701: NO), the control unit ends the processing. On the other hand, upon receiving no processing end instruction and determining to continue the processing (step S701: YES), the control unit advances the process to step S702. In step S702, the image acquisition unit 101 acquires an image input to the image processing apparatus 100. In step S703, the object detection unit 102 performs object detection processing for the acquired image. In step S704, the object detection unit 102 determines whether an object is detected in step S703. Upon determining that no object is detected (step S704: NO), the process returns to step S701. On the other hand, upon determining an object is detected (step S704: YES), the process advances to step S705.

In step S705, the object tracking unit 103 performs object tracking processing. In step S706, the track management unit 107 updates track information in accordance with the tracking processing result in step S705. In step S707, the human body detection unit 104 performs human body detection processing for the region where the object detection unit 102 has detected the object in a human body detection processing region set by the parameter setting unit 105.

Figure 8A:
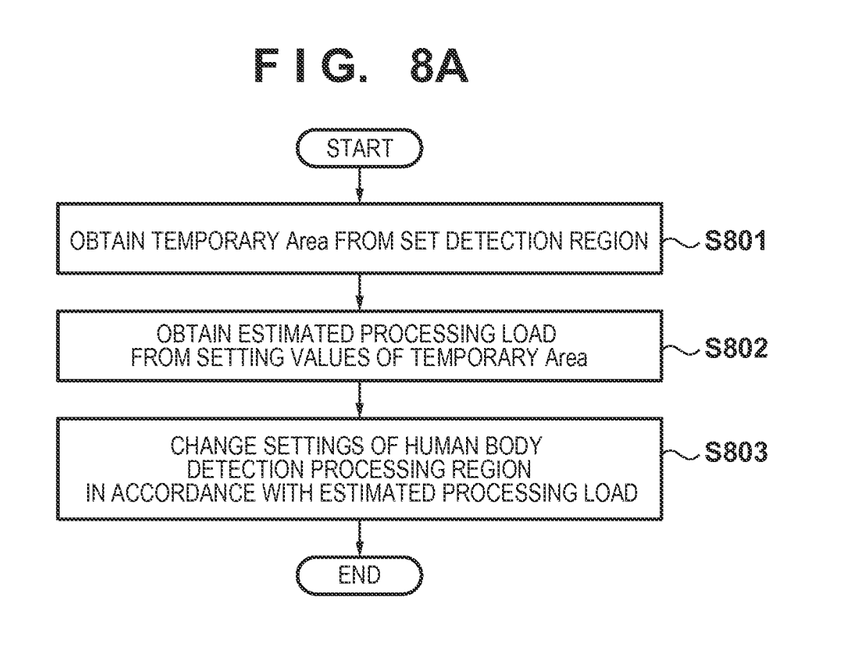
FIGS. 8A and 8B are flowcharts showing the procedure of human body detection processing.

Details of human body detection processing region setting processing will be described here with reference to the flowchart of FIG. 8A. In step S801, the parameter setting unit 105 obtains a temporary human body detection processing region (temporary Area) from the setting parameters of the detection processing region set for the first time. In step S802, the parameter setting unit 105 obtains the estimated processing load from the setting parameters of the temporary human body detection processing region. The estimated processing load is the evaluation information of the temporary detection processing region. In step S803, the parameter setting unit 105 changes the sensing line and the human body detection processing region, displays an alert, or controls movement of the mouse cursor in accordance with the estimated processing load such that the estimated processing time becomes shorter than a predetermined time, and decides the parameters that define the sensing line and the human body detection processing region. The parameters decided in step S803 to define the human body detection processing region are used as the parameters of human body detection processing in step S707 described above.

Referring back to FIG. 7, in step S708, the human body detection unit 104 determines, in accordance with the result of human body detection processing in step S707, whether a human body is detected. Upon determining that no human body is detected (step S708: NO), the process advances to step S711. On the other hand, upon determining that a human body is detected (step S708: YES), the process advances to step S709.

In step S709, the object association unit 106 performs association processing of the object and the human body. In step S710, the track management unit 107 updates object management information (FIG. 5) based on the result of association processing in step S709. In step S711, the track information determination unit 108 performs crossing determination processing, and determines whether the object crosses the sensing line. In step S712, the external output unit 109 externally outputs the determination result of crossing determination processing, and the process returns to step S701. Each process of the flowchart in FIG. 7 thus ends.

Processing of arranging a virtual graphic, a straight line, in the screen and deciding the human body detection processing region using the position information of the arranged straight line, the crossing direction information, and the like to detect crossing of the object in the video has been described above. The virtual graphic used to determine object crossing sensing is not limited to the straight line, and any other graphic is usable. For example, a graphic that two-dimensionally expresses a specific place of a three-dimensional space in a video or a virtual region set on a three-dimensional space is usable as long as the human body detection processing region on the graphic in the video can be known. In this embodiment, a visually perceivable virtual graphic is arranged and displayed on the screen. However, the virtual graphic need not always be visually perceivable.

According to this embodiment, in detection processing of an object from an image obtained from a monitoring camera or the like, the processing load is estimated, and settings of the detection processing region are changed in accordance with the processing load. This makes it possible to suppress occurrence of the event of an increase in the load or a decrease in the processing speed.

Second Embodiment

In the first embodiment, an arrangement has been described which performs, at the time of detection processing region setting attended with specific object detection (human body detection or face detection) in an image, detection processing of the specific object and sets the detection processing region in accordance with a processing load serving as an evaluation value. In the second embodiment, an arrangement that, for example, obtains a processing load for an entire screen as the background in advance and sets a human body detection processing region will be explained.

Figure 9:
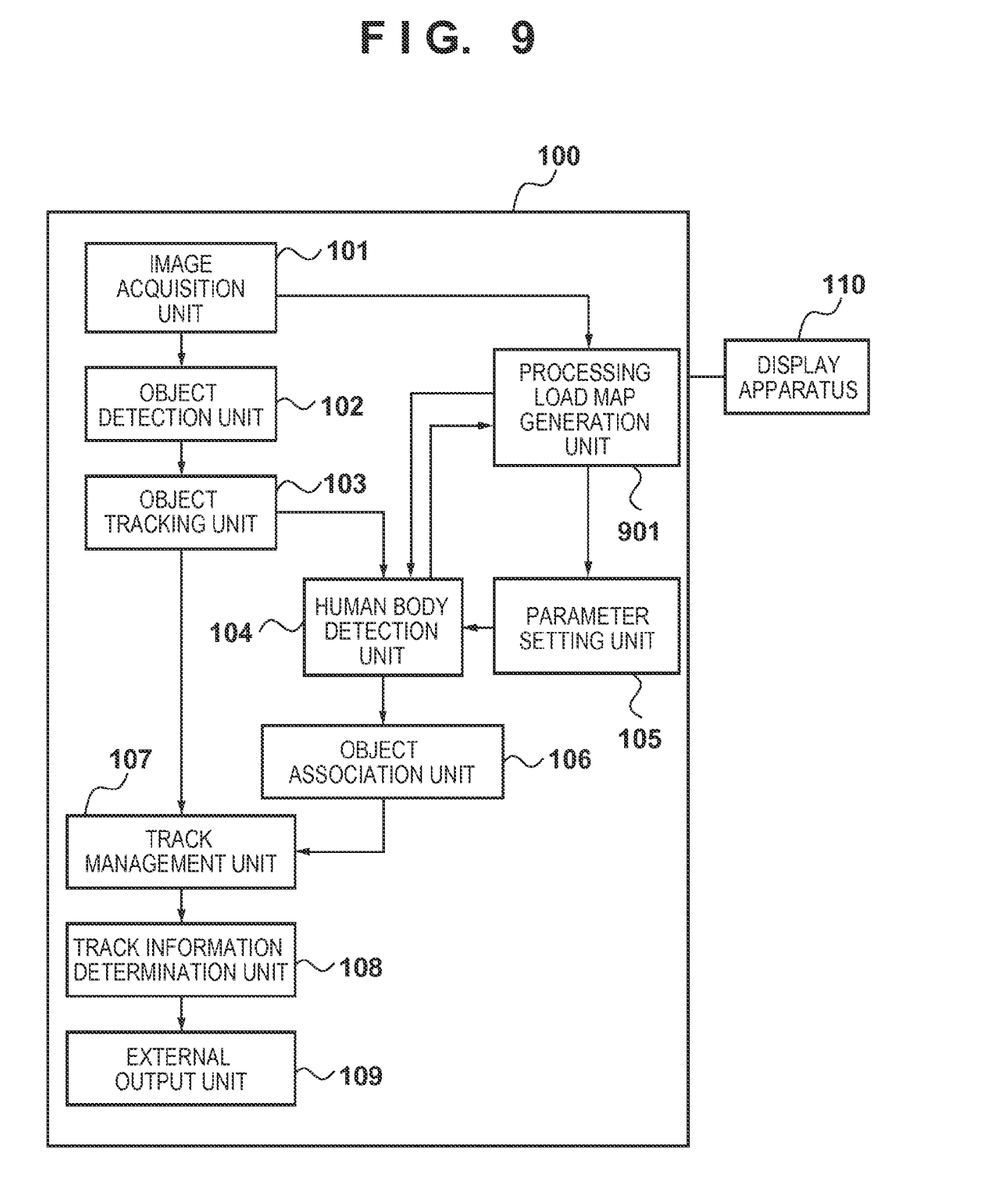
FIG. 9 is a block diagram showing an example of the arrangement of an image processing apparatus according to the second embodiment.

An example of the arrangement of an image processing apparatus 100 according to the second embodiment will be described with reference to FIG. 9. In this embodiment, the same reference numerals as in FIG. 1 denote the same parts, and a description thereof will be omitted. Referring to FIG. 9, a processing load map generation unit 901 acquires an image (for example, background image) from an image acquisition unit 101, and performs processing load map (evaluation information map) generation processing for the whole region of the acquired image (background image). The processing load map is obtained by dividing a whole image into mesh-like blocks (partial regions), acquiring the processing load of human body detection (human body detection processing load) of each block in advance, and recording the acquired human body detection processing load in association with each block. The processing load map is not limited to the set of mesh-like blocks (rectangular regions) and need only acquire the processing load of each partial region of an image. As for the processing load map saving format and the method of calculating (acquiring) the processing load of each partial region, for example, the processing load need not always be calculated (acquired) and saved in the image processing apparatus 100. A human body detection processing load calculated by an external information processing apparatus may be acquired.

Additionally, when obtaining the processing load, a human body detection unit 104 that executes actual detection processing may be used, or a separate evaluation information calculation unit (not shown) dedicated to acquire the processing load or processing speed may be used. When the evaluation information calculation unit that is provided independently of the human body detection unit 104 and is dedicated to the processing is used, the processing load can be obtained without interfering with the detection processing function of the human body detection unit 104. Alternatively, the complexity of the background image may be calculated and mapped, and the processing load (=evaluation information of detection processing region) may be estimated from the sum of complexities of target regions in the complexity map.

Figure 10:
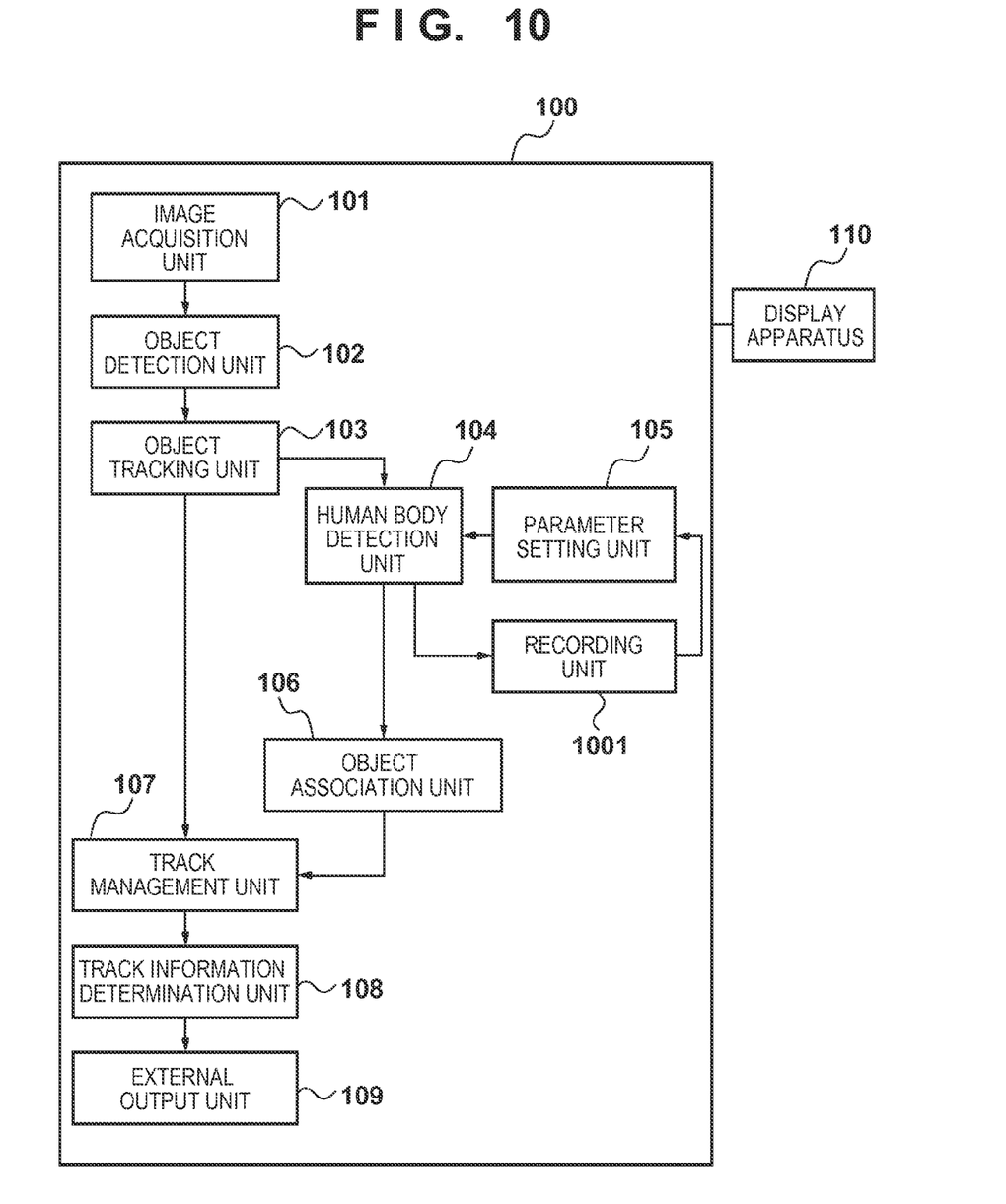
FIG. 10 is a block diagram showing another example of the arrangement of the image processing apparatus according to the second embodiment.

In the explanation of the image processing apparatus 100 shown in FIG. 9, an arrangement that causes the processing load map generation unit 901 to generate the processing load map from the background image acquired by the image acquisition unit 101 has been described. However, the present invention is not limited to this arrangement example. For example, as shown in FIG. 10, a recording unit 1001 may be used without providing the processing load map generation unit 901. For example, the result of the processing load of the human body detection processing by the human body detection unit 104 may be recorded in the recording unit 1001 as a processing load map corresponding to each partial region of an image (video). The human body detection unit 104 records, for example, each partial region (detection target region) of the image (video) when executing human body detection processing and the processing time when executing human body detection processing in the partial region in the recording unit 1001 as the result of the processing load of the human body detection processing. A parameter setting unit 105 can use each partial region (detection target region) and the processing time recorded in the recording unit 1001 as parameters that define a human body detection processing region. According to the arrangement shown in FIG. 10, the results of many human body detection processes executed in the past and recorded in the recording unit 1001 can be used. It is therefore possible to obtain a more accurate estimated processing load and reflect it on human body detection processing region setting processing.

Figure 8B:
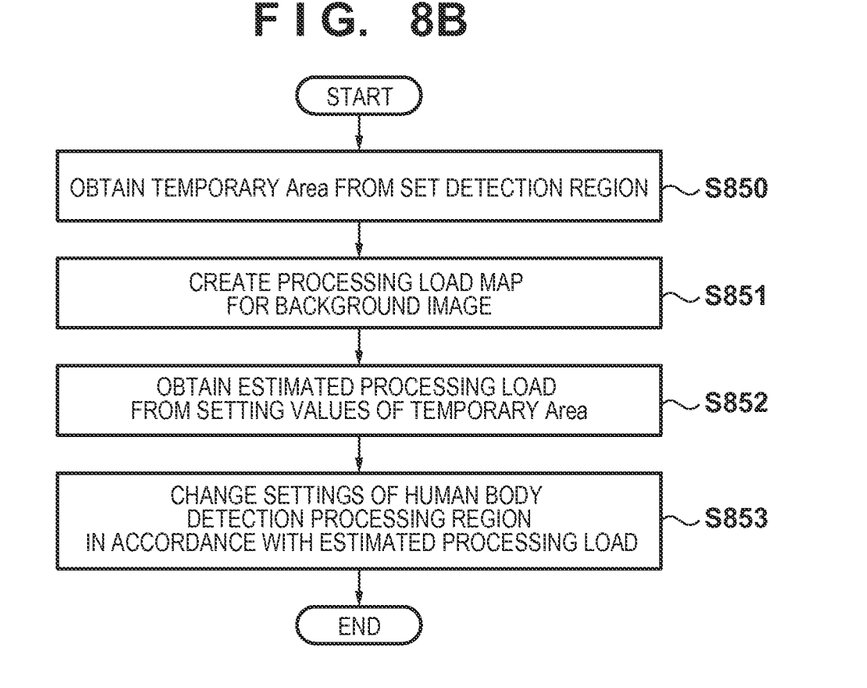

Human body detection processing region setting processing in the image processing apparatus 100 according to this embodiment will be described with reference to the flowchart of FIG. 8B. In step S850, the parameter setting unit 105 obtains a temporary human body detection processing region (temporary Area) from the setting parameters of a detection processing region set for the first time.

In step S851, the processing load map generation unit 901 performs processing load map generation processing for the whole region of the image (for example, background image) acquired for the image acquisition unit 101. As shown in FIG. 10, when using the result of the processing load of human body detection processing by the human body detection unit 104, each partial region of the image (video) and the processing time when executing the human body detection processing in the partial region, which are recorded in the recording unit 1001, are used as the processing load map.

In step S852, the parameter setting unit 105 obtains the estimated processing load from the setting values of the temporary human body detection processing region using the processing load map acquired in step S851. The estimated processing load is the evaluation information of the temporary detection processing region.

In step S853, the parameter setting unit 105 changes the sensing line and the human body detection processing region, displays an alert, or controls movement of the mouse cursor in accordance with the estimated processing load such that the estimated processing time becomes shorter than a predetermined time, and decides the parameters that define the sensing line and the human body detection processing region. The parameters decided in step S853 to define the human body detection processing region are used as the parameters of human body detection processing in step S707 of FIG. 7.

Figure 3F:
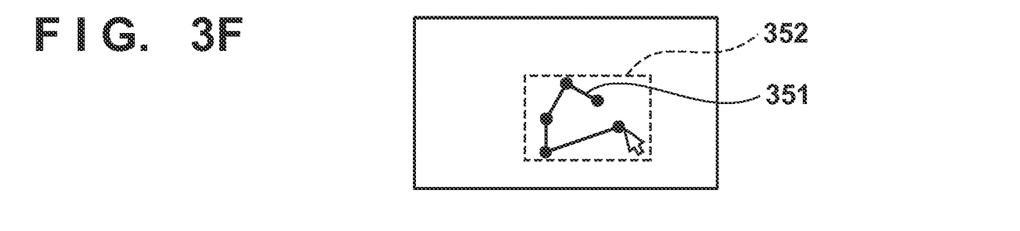

FIG. 3F is a view showing an example of screen display at the time of human body detection processing region setting. In FIG. 3F, a human body detection processing region 352 is displayed, which is obtained from a processing load map and the setting parameters of a temporary human body detection processing region obtained during setting of a sensing line 351 by the drag-and-drop operation of a mouse cursor 304 or the like. When a line segment is drawn by the drag-and-drop operation of the mouse cursor 304 or the like, and the setting parameters of the temporary human body detection processing region are changed, the human body detection processing region 352 according to the changed setting parameters is displayed every time the change has occurred. The parameter setting unit 105 restricts the operation of the GUI (user interface) so the human body detection processing does not exceed a predetermined processing load. For example, the parameter setting unit 105 suppresses setting of the human body detection processing region by the GUI so the human body detection processing region 352 does not obtain a predetermined area or more. More specifically, when the area of the detection processing region deviates from a predetermined threshold, a GUI operation for setting the detection processing region is declared. When the feature amount of the image changes from the processing load map by more than a predetermined threshold, the parameter setting unit 105 outputs an alert indicating that the evaluation information to set the human body detection processing region needs to be changed, and reacquires the evaluation information.

According to this embodiment, when setting parameters that define a human body detection processing region, a processing load map generated in advance is used. This makes it possible to perform human body detection processing region setting processing (displaying an estimated processing speed, alert, or processing range on the setting screen) at a high speed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-271778, filed Dec. 12, 2012, which is hereby incorporated by reference herein in its entirety.

What is claimed is:

1. A setting apparatus for setting a detection processing region in an image where detection processing for detecting a specific object is performed by a processor, the processor comprising:
   an acquisition unit configured to acquire an input from a user interface to designate the detection processing region in the image where the detection processing for detecting the specific object is performed;
   an obtaining unit configured to obtain evaluation information based on a processing load of the detection processing in the detection processing region which is in the image and is designated by the input from the user interface; and
   a setting unit configured to set the detection processing region corresponding to a size smaller than a size of the detection processing region which is in the image and is designated by the input from the user interface, to detect the specific object in accordance with the evaluation information obtained by the obtaining unit,
   wherein the setting unit sets the detection processing region according to time information and/or situation information related to image taking.

2. The apparatus according to claim 1, wherein the processor further comprises an outputting unit configured to output an alert when the evaluation information exceeds a predetermined threshold.

3. The apparatus according to claim 1, wherein the setting unit calculates a predicted value of a detection processing speed of the specific object in the set detection processing region, and controls a display unit to display the predicted value of the detection processing speed.

4. The apparatus according to claim 1, wherein the evaluation information for the input concerning the detection processing region from the user interface is a processing time for the detection processing of the specific object in the detection processing region in the image based on the input from the user interface.

5. The apparatus according to claim 1, wherein the processor further comprises a generation unit configured to generate the evaluation information for each of a plurality of partial regions of the image,
   wherein the setting unit sets the detection processing region having the size smaller than the size of the detection processing region which is designated by the input from the user interface, in accordance with the evaluation information of a partial region corresponding to the detection processing region based on the input concerning the detection processing region from the user interface.

6. The apparatus according to claim 1, wherein the processor further comprises a recording unit configured to record, for each of a plurality of partial regions of the image, a processing time when executing detection processing for each partial region,
   wherein the setting unit sets the detection processing region having the size smaller than the size of the detection processing region which is designated by the input from the user interface, in accordance with the processing time corresponding to the detection processing region based on the input concerning the detection processing region from the user interface.

7. An image processing apparatus including a detection unit configured to detect a specific object from an image using a processor, the processor comprising:
   an acquisition unit configured to acquire an input from a user interface to designate a detection processing region in the image where the detection processing for detecting the specific object is performed by the detection unit;
   an obtaining unit configured to obtain detection status information related to status of the detection processing by the detection unit in the detection processing region which is in the image and is designated by the input from the user interface; and
   a processing unit configured to change a size of the detection processing region which is in the image and is designated by the input from the user interface in accordance with the detection status information obtained by the obtaining unit and related to the status of the detection processing in the detection processing region which is designated by the input from the user interface,
   wherein the processing unit changes the detection processing region according to time information and/or situation information related to image taking.

8. The apparatus according to claim 7, wherein the processor further comprises a display control unit configured to display an alert when a time needed for the detection processing by the detection unit in the detection processing region according to the input acquired by the acquisition unit is not less than a predetermined time.

9. The apparatus according to claim 7, wherein the processing unit performs processing of narrowing the detection processing region which is designated by the input from the user interface when a time needed for the detection processing by the detection unit in the detection processing region according to the input acquired by the acquisition unit is not less than a predetermined time.

10. The apparatus according to claim 7, wherein the processing unit performs processing of widening the detection processing region which is designated by the input from the user interface in accordance with the detection status information obtained by the obtaining unit for the detection processing region according to the input acquired by the acquisition unit.

11. The apparatus according to claim 7, wherein the processing unit returns the detection processing region changed based on the detection status information for a first time period to the detection processing region before the change in the detection processing region in accordance with the detection status information for a second time period which is later than the first time period.

12. The apparatus according to claim 7, further comprising an input unit configured to input an image captured by an image capturing unit,
wherein the processing unit returns the detection processing region changed based on the detection status information to the detection processing region before the change in the detection processing region in accordance with a change in an image capturing range of the image capturing unit after the change in the detection processing region.

13. A control method of a setting apparatus for setting a detection processing region in an image where detection processing for detecting a specific object is performed, comprising:
an acquisition step of acquiring an input from a user interface to designate the detection processing region in the image where the detection processing for detecting the specific object is performed:
an obtaining step of obtaining evaluation information based on a processing load of the detection processing in the detection processing region which is in the image and is designated by the input from the user interface; and
a setting step of setting the detection processing region corresponding to a size smaller than a size of the detection processing region which is in the image and is designated by the input from the user interface, to detect the object in accordance with the evaluation information obtained in the obtaining step,
wherein in the setting step, the detection processing region is set according to time information and/or situation information related to image taking.

14. The method according to claim 13, further comprising an outputting step of outputting an alert when the evaluation information exceeds a predetermined threshold.

15. The method according to claim 13, wherein in the setting step, a predicted value of a detection processing speed of the specific object in the set detection processing region is calculated, and the predicted value of the detection processing speed is displayed on a display unit.

16. The method according to claim 13, wherein the evaluation information for the input concerning the detection processing region from the user interface is a processing time for the detection processing of the specific object in the detection processing region in the image based on the input from the user interface.

17. A non-transitory computer-readable storage medium storing a program to control a computer including a detection unit configured to detect a specific object from an image, the program comprising:
an acquisition step of acquiring an input from a user interface to designate a detection processing region in the image where the detection processing for detecting the specific object is performed by the detection unit;
an obtaining step of obtaining detection status information related to status of the detection processing by the detection unit in the detection processing region which is in the image and is designated by the input from the user interface; and
a processing step of changing a size of the detection processing region which is in the image and is designated by the input from the user interface in accordance with the detection status information obtained in the obtaining step and related to the status of the detection processing in the detection processing region which is designated by the input from the user interface,
wherein, in the processing step, the detection processing region is set according to time information and/or situation information related to image taking.

18. The storage medium according to claim 17, further comprising a display control step of displaying an alert when a time needed for the detection processing by the detection unit in the detection processing region according to the input acquired in the acquisition step is not less than a predetermined time.

19. The storage medium according to claim 17, wherein in the processing step, processing of narrowing the detection processing region which is designated by the input from the user interface is performed when a time needed for the detection processing by the detection unit in the detection processing region according to the input acquired in the acquisition step is not less than a predetermined time.

20. The storage medium according to claim 17, wherein in the processing step, processing of widening the detection processing region which is designated by the input from the user interface is performed in accordance with the detection status information obtained in the obtaining step for the detection processing region according to the input acquired in the acquisition step.

21. The storage medium according to claim 17, wherein in the processing step, the detection processing region changed based on the detection status information for a first time period is returned to the detection processing region before the change in the detection processing region in accordance with the detection status information for a second time period which is later than the first time period.

22. The storage medium according to claim 17, further comprising an input step of inputting an image captured by an image capturing unit,
wherein in the processing step, the detection processing region changed based on the detection status information is returned to the detection processing region before the change in the detection processing region in accordance with a change in an image capturing range of the image capturing unit after the change in the detection processing region.

23. A non-transitory computer-readable storage medium storing a program to control a computer for setting a detection processing region in an image where detection processing for detecting a specific object is performed, the program comprising:

an acquisition step of acquiring an input from a user interface to designate the detection processing region in the image where the detection processing for detecting the specific object is performed:

an obtaining step of obtaining evaluation information based on a processing load of the detection processing in the detection processing region which is in the image and is designated by the input from the user interface; and a setting step of setting the detection processing region corresponding to a size smaller than a size of the detection processing region which is in the image and is designated by the input from the user interface, to detect the specific object in accordance with the evaluation information obtained in the obtaining step, wherein in the setting step, the detection processing region is set according to time information and/or situation information related to image taking.

24. The storage medium according to claim 23, further comprising an outputting step of outputting an alert when the evaluation information exceeds a predetermined threshold.

25. The storage medium according to claim 23, wherein in the setting step, a predicted value of a detection processing speed of the specific object in the set detection processing region is calculated, and the predicted value of the detection processing speed is displayed on a display unit.

26. The storage medium according to claim 23, wherein the evaluation information for the input concerning the detection processing region from the user interface is a processing time for the detection processing of the specific object in the detection processing region in the image based on the input from the user interface.

27. A setting apparatus for setting a detection processing region in an image where detection processing for detecting a specific object is performed by a processor, the processor comprising:

an acquisition unit configured to acquire an input from a user interface to designate the detection processing region in the image where the detection processing for detecting the specific object is performed:

an obtaining unit configured to obtain evaluation information based on a processing load of the detection processing in the detection processing region which is in the image and is designated by the input from the user interface; and a display control unit configured to cause a display unit to display a notification that indicates that a size of the detection processing region which is designated by the input from the user interface should be smaller in accordance with the evaluation information obtained by the obtaining unit, wherein the size of the detection processing region is determined according to time information and/or situation information related to image taking.

* * * * *